Aug. 13, 1929.   A. S. DANA   1,724,565
APPARATUS FOR TESTING INSULATION
Original Filed Jan. 10, 1925
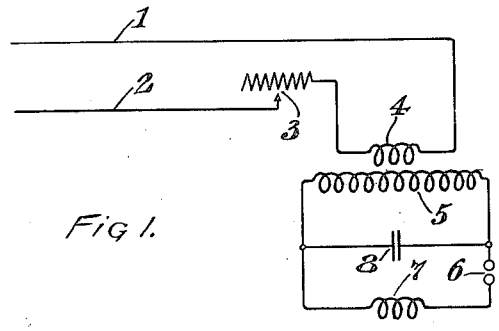
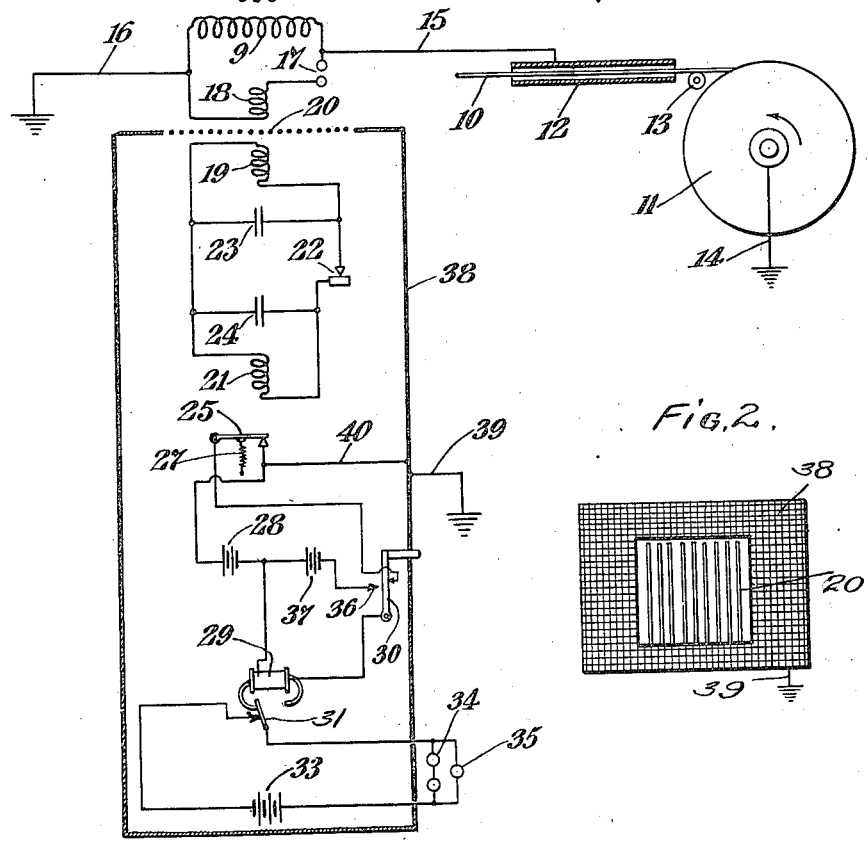
Inventor
Alan Standish Dana
By his Attorneys
Ward, Crosby & Smith Patented Aug. 13, 1929.

1,724,565

UNITED STATES PATENT OFFICE.

ALAN STANDISH DANA, OF ANSONIA, CONNECTICUT, ASSIGNOR TO THE KERITE INSULATED WIRE AND CABLE COMPANY, A CORPORATION OF CONNECTICUT.

APPARATUS FOR TESTING INSULATION.

Application filed January 10, 1925, Serial No. 1,596. Renewed June 19, 1929.

My invention relates to improvements in apparatus for testing insulation and while the invention is applicable to the testing of many different forms and kinds of insulation, it is particularly adapted for testing insulation on electric wires or conductors.

In the testing of insulated wires and cables it has been customary, with the better grades, to immerse a coil of the insulated wire or cable in a tank of water and apply a high voltage, one terminal of which is connected to the conductor and the other terminal of which is connected to the water, the voltage being sufficiently high so that should there be certain imperfections in the insulation the insulation will break down thereat under the high voltage causing gases to form and bubbles to appear in the water, thereby indicating the imperfection to the operator.
With insulated conductors which are taped or have other operations performed thereon after the insulation is applied the same should be tested after each operation and it has been customary to apply such test two or three times during the manufacturing processes, all of which involves considerable loss of time and the immersion in water is also disadvantageous to the tape or other material with which the insulated conductor may be covered. Also, there has been considerable danger to the workman due to the high voltage employed in the testing.

According to my invention in the preferred form thereof described below, the insulation on the conductor may be continuously tested, that is, the test may be applied as the insulated wire passes to or from any of the manufacturing operations and is being wound upon or unwound from a reel and without stopping its movement. Therefore much time is saved, a number of operations are eliminated and the number of times the conductor or cable has to be handled is reduced, thereby resulting in a substantial saving. Also, according to my invention in its preferred form, the high voltage used for testing is not dangerous to the workmen and the disadvantages of immersion in water are eliminated. The testing of the insulated conductor or cable requires no separate operation in point of time since the testing may be made during one or more of the customary operations such as before or after taping, saturating the braid thereon or re-reeling and the necessary high potential is applied conveniently and continuously while the insulation is passing to or from any such operation. Furthermore, according to my invention in its preferred form, in case an imperfection in the insulation is detected, warning of this is immediately given to the operator by a suitable signal, such as the ringing of a bell, which may be caused to continue to ring until the operator takes cognizance thereof and marks or cuts out the imperfection and performs some manual operation, such as pressing a button to stop the ringing of the bell and reset the apparatus.

Further and more specific objects, features and advantages will more clearly appear from the detailed description given below taken in connection with the accompanying drawings in which Fig. 1 illustrates diagrammatically a system or apparatus embodying my improvements in one form, and Fig. 2 illustrates a screening device forming a part of the apparatus of Fig. 1.

Referring to the drawing, 1 and 2 represent supply mains supplying a relatively low frequency (e. g. 60 cycles per second) alternating current at relatively low voltage (e. g. 220 volts). Connected to these mains in series with a rheostat 3 is the primary 4 of a step-up transformer adapted to step the voltage up to about 8000 volts in the secondary 5 of the transformer. Connected in series with the secondary 5 is a spark gap 6 and the primary 7 of a Tesla transformer. Connected across the secondary winding 5 and parallel to the series circuit containing gap 6 and primary 7 is a condenser 8. The secondary 5 charges the condenser 8 which discharges at rapid intervals across the spark gap 6. The gap 6 is provided with means for breaking any arc which tends to be formed thereacross and for this purpose it may be subjected to the action of compressed air in any suitable or well known manner or any suitable arrangement may be provided for quenching the gap or preventing the continuance of any arc thereat while permitting the frequent discharge of the condenser 8 thereacross. The constants of the condenser 8 and inductance of coil 7 are such as to produce a high frequency damped oscillation in winding 7 when the condenser 8 discharges across the gap 6. The frequency of the current thus set up in the primary winding 7 should, for best results, be much above 10,000 cycles per second, and I prefer to use a frequency of 100,000 cycles per second or more. In this manner the high voltage used in testing is rendered substantially harmless to the operators and workmen. In practice I prefer to use a considerably higher frequency, between 500,000 and 1,500,000 cycles per second, because currents at such high frequencies pass through small capacities readily and it is unnecessary to connect the metal conductor of the insulated wire or cable to either terminal of the high potential. The high voltage high frequency discharge current of condenser 8, by means of the primary 7, induces current in the cooperating secondary winding 9 of the same frequency and preferably of somewhat higher voltage, i. e. from 10,000 volts to 20,000 volts or more.

The insulated wire or cable 10 to be tested is shown being unwound from the reel 11. The insulated wire or cable may be going to any of the manufacturing operations or may merely be being re-reeled. As the wire or cable leaves the reel 11, it passes over an idler roller 13 and continuously and loosely through a section of metal pipe 12, or other metallic device such as a helix made of metal rod, or two metal pulleys or between flat metal plates. The reel 11 is preferably coated with a layer of metal which is connected to ground as indicated by the connection 14. The apparatus (as for example the saturating and taping apparatus) to which the insulated wire is being fed is also grounded. One terminal of the high potential high frequency secondary 9 is connected to the pipe section 12 by conductor 15 and the other terminal of the secondary 9 is connected to ground as by conductor 16. The insulation is tested as the wire or cable passes through the pipe section 12. Between the conductor 15 and the grounded reel 11 two condensers or capacities are introduced in series, the elements of the first being the tube 12 and the metallic conductor and the elements of the second being the metallic conductor and the metal portions of reel 11. Another capacity is introduced between the conductor and the metal of the apparatus to which the insulated wire is being fed, so that when either end of the wire is passing through the pipe 12 there is still one path left to ground for the current. In each case the high frequency circuit path includes the insulation on the conductor. The circuit is completed to the other side of the secondary 9 through the ground connection 16, but at no point is the metal conductor of the insulated wire or cable connected to the source of high potential, although the capacity current may pass therethrough.

Connected to the secondary 9 and in parallel relation to the insulation testing point at 12 and the reel 11, is a branch circuit having therein a spark gap 17 and a primary winding 18 of another transformer. The secondary 9, therefore, also causes a high voltage high frequency current to be set up in the winding 18 and this induces electromagnetically an alternating current in the secondary 19 of the transformer. Between the windings 18 and 19 is placed a shield or grid 20 of parallel wires to prevent the winding 18 from inducing current in the winding 19 electrostatically. The shield or grid 20 as indicated in Fig. 2 is formed of a plurality of separated parallel wires connected together at one end only and insulated from one another at the opposite end and is therefore substantially free of eddy currents. Connected to the terminals of the secondary 19 is an electromagnet winding 21 and in circuit between the windings 19 and 21 is a rectifying device 22, such as a two electrode vacuum tube. Connected across the secondary 19 ahead of the rectifying device is a condenser 23 and connected across the winding 21 is another condenser 24. The value of the condenser 23 is such as to give resonance with the secondary 19 at the frequency employed in order that the voltage produced thereacross may be as large as possible. The condenser 24 is inserted to bypass any high frequency current which may pass by the rectifier 22 and make the rectified supply to the winding 21 more uniform and continuous.

25 represents a relay switch, normally closed by a spring 27. The switch 25 is connected in circuit with a battery 28, and electromagnet coil 29 and a push button switch 30. 31 represents a polarized relay switch connected in circuit with a battery 33 and electric signal bell 34 and a signal lamp 35. The switch 31 is operated by the electromagnet coil 29 and is so constructed that it will be closed thereby when the current in coil 29 is in one direction and will be opened thereby when the current in coil 29 is in the opposite direction, and will remain in either position when the coil 29 is de-energized. When the switch 25 is closed the battery energizes coil 29 in a direction to close switch 31 and the switch 31 will remain closed even after switch 25 is opened. When it is desired to open switch 31 the push button switch is pushed to make contact with contact 36 thereby connecting the coil 29 in circuit with a battery 37 which sends a current through the coil 29 in the opposite direction and causes the switch 31 to open, thus stopping the energization of the signal means 34 and 35. The circuit of coils 19 and 21 and the various elements included in that circuit as well as the circuits of coil 29 and battery 33 are preferably substantially encased and enclosed in metal box like structure 38, grounded as by connection 39, to prevent stray capacity currents from affecting the operation thereof from the outside. Any other suitable means may be used to encase the conductors of these circuits in grounded metal, as by enclosing them in lead sheaths of metal conduits, grounded in any suitable manner. One side of the circuit of switch 25 is grounded by being connected to the metal enclosure 38 by connection 40.

In operation the high voltage high frequency current induced in secondary 9 is continuously applied to the tube 12 as the insulated conductor passes therethrough, and also to the primary 18 which induces similar current in the secondary 19. The secondary 19, by reason of the inclusion of the rectifier 22, supplies a uni-directional current to the electromagnetic winding 21 which holds the switch 25 open so that coil 29 is deenergized and polarized switch 31 remains open and the signals 34, 35 are deenergized. However, should a hole or thin spot in the insulation on the wire or cable 10 pass through the tube 12 a spark will pass from the tube 12 to the conductor of the wire or cable 10, and the high voltage will discharge i. e. spark-over, through the insulation, and cause a reduction of current in coil 18. I believe this is due to the fact that such spark jumping through the insulation at the defect, so reduces the resistance in the circuit 14, 15, 16, that the branch shunt circuit of coil 18 is robbed of the most of its current. In any event I find that with the parts properly chosen and adjusted the energy in coil 18 is so reduced by such breakdown through the insulation that the voltage induced in secondary 19 is reduced and coil 21 sufficiently deenergized to allow the switch 25 to close under the action of spring 27 whereby coil 29 is energized to close the switch 31 and operate the signal means 34 and 35. Immediately the defect in the insulation passes out of the tube 12 and the winding 18 becomes again fully energized and switch 25 is opened by coil 21, and coil 29 is deenergized, but switch 31 remains closed. The signal bell 34 will therefore continue to ring until the operator remedies the situation. Upon the operator's attention being thus called to the defect he will stop the reeling of the conductor 10, unwind sufficient of the conductor to locate the defect and either mark the same for further attention, or cut it out and proceed with the testing of the rest of the insulated wire or cable. Before proceeding with further testing, however, the operator will operate the push button switch 30 to connect the battery 37 with the coil 29 so as to energize the latter in a direction to open the switch 31 and deenergize the signals 34 and 35 and so reset the apparatus. It will be noted that any failure of the alternating current supply or any disconnection in the high voltage or high frequency circuits will result in a deenergization of coil 21 causing the switch 25 to close and the signals to be operated, and upon finding no defect in the insulation the operator will understand that apparatus is not functioning properly. The arrangement therefore acts as its own monitor and one is assured that it is at all times in condition to locate imperfections, if the signal means 34 and 35 are not operating.

While I have described my improvements in great details and with respect to a preferred form thereof, I do not desire to be limited to such details or form, since many changes and modifications may be made and the improvements embodied in widely different forms without departing from the spirit and scope of the invention in its broader aspects. In certain cases many features may be omitted all together. Hence I desire to cover all modifications and forms coming within the language or scope of any one or more of the appended claim.

What I claim as new, and desire to secure by Letters Patent, is:

In an apparatus for testing insulation, a source of high frequency alternating or oscillating current, a circuit coupled therewith including an inductance coil and condenser, one plate of said condenser comprising a traveling insulated conductor, and indicating means responsive to changes of current in said inductance coil upon the breakdown of said condenser, due to failure of the insulation of said insulated conductor when forming part of said condenser.

In testimony whereof I have signed my name to this specification.

ALAN STANDISH DANA.